United States Patent
Noller et al.

(10) Patent No.: US 8,597,155 B2
(45) Date of Patent: Dec. 3, 2013

(54) PLANETARY GEARING

(75) Inventors: Klaus Noller, Oppenweiler (DE); Gerhard Bauer, Witten (DE); Thomas Matern, Bochum (DE); Wilfried Michel, Schwerte (DE); Marco Lehmann, Wuppertal (DE)

(73) Assignee: Robert Bosch GmbH, Stuttgart (DE)

(*) Notice: Subject to any disclaimer, the term of this patent is extended or adjusted under 35 U.S.C. 154(b) by 0 days.

(21) Appl. No.: 13/495,134

(22) Filed: Jun. 13, 2012

(65) Prior Publication Data
US 2012/0322607 A1 Dec. 20, 2012

(30) Foreign Application Priority Data
Jun. 16, 2011 (DE) .......... 10 2011 104 291

(51) Int. Cl.
*F16H 57/08* (2006.01)

(52) U.S. Cl.
USPC ............ 475/331; 74/606 R; 74/640

(58) Field of Classification Search
USPC ............... 74/606 R, 640; 475/331
See application file for complete search history.

(56) References Cited

U.S. PATENT DOCUMENTS

| | | | | |
|---|---|---|---|---|
| 3,774,477 A | * | 11/1973 | Murphy | 475/337 |
| 3,813,956 A | * | 6/1974 | Whitecar | 474/88 |
| 3,913,415 A | * | 10/1975 | Herr | 475/124 |
| 5,085,713 A | * | 2/1992 | Morishita et al. | 148/211 |
| 5,195,400 A | * | 3/1993 | Hayakawa et al. | 74/606 R |
| 5,328,418 A | * | 7/1994 | Meyerle | 475/81 |
| 5,401,218 A | * | 3/1995 | Rassieur et al. | 475/18 |
| 6,255,751 B1 | * | 7/2001 | Hoffmann | 310/83 |
| 6,790,156 B2 | * | 9/2004 | Hosle | 475/331 |
| 2010/0236357 A1 | * | 9/2010 | Simpson et al. | 74/606 R |

FOREIGN PATENT DOCUMENTS

DE 32 23 632 A1 12/1983

* cited by examiner

*Primary Examiner* — Justin Holmes
(74) *Attorney, Agent, or Firm* — Maginot, Moore & Beck

(57) ABSTRACT

Planetary gearing, in particular multistage planetary gearing, is disclosed. The planetary gearing includes at least one drive shaft, an output shaft, a sun wheel, a ring gear, planet wheels assigned to the planetary gear train, a gear casing, in particular a multipart gear casing, a planetary gear train, in particular the second planetary gear train, comprising a planet wheel arm immovably arranged in a casing. The construction of such a planetary gearing is simplified compared to the prior art, thereby saving costs. This is achieved in that the planet wheel arm is integrally formed with a casing.

13 Claims, 2 Drawing Sheets

PLANETARY GEARING

This application claims priority under 35 U.S.C. §119 to patent application no. DE 10 2011 104 291.5, filed on Jun. 16, 2011 in Germany, the disclosure of which is incorporated herein by reference in its entirety.

The disclosure relates to a planetary gearing, comprising at least one drive shaft, an output shaft, a sun wheel, a ring gear and planet wheels assigned to the planetary gear train, a gear casing, the planetary gear train comprising a planet wheel arm immovably arranged in a casing.

BACKGROUND

Such a planetary gearing is disclosed by DE 32 23 632 A1. This planetary gearing of two-stage design is embodied as a free-fall winch, which is driven by a hydraulic motor. Here the hydraulic motor acts on the sun wheel of a first planetary gear train, the planet wheel arm of which is connected to the sun wheel of a second planetary gear train. The free-fall winch further comprises a drum brake, which serves to influence the rotation of the cable drum. In this planetary gearing the planet wheel arm of the second planetary gear train is flange-connected, that is to say bolted, to the winch frame.

SUMMARY

The object of the disclosure is to provide a planetary gearing, which is of simplified construction compared to the prior art, thereby saving costs.

This object is achieved in that the planet wheel arm is integrally formed with the casing. This integral formation achieves a cost saving through technical advantages in casting and production engineering. Furthermore, a time saving is achieved both in production and in assembly. In addition, a sealing face between the planet wheel arm and the casing is eliminated. Savings are also made in respect of the fasteners, for example screws, bolts etc, hitherto needed for fixing the planet wheel arm to the casing. This also affords advantages in terms of weight, together with greater reliability of the overall planetary gearing.

In principle the subject matter of the disclosure can be used in a single-stage planetary gearing, but the planetary gearing is preferably a multistage planetary gearing having a multipart gear casing. The subject matter of the disclosure can be implemented to particular advantage in such a multistage planetary gearing having a multipart gear casing.

In a development of the disclosure the casing is a part of the gear casing. The entire (multistage) planetary gearing is of multipart design in order to facilitate assembly, although the number of parts is reduced by forming the planet wheel arm integrally with the casing.

In a further embodiment of the disclosure the casing is a cast casing. Such a cast casing with the integrated planet wheel arm is technically easy to cast. Here in a further embodiment of the disclosure the planet wheel arm is connected to the casing or a side wall of the casing by way of at least one connecting web. Here the side wall forms a part of the planet wheel arm. Such a method of connection can be effectively realized when producing the casting mold. Again in a further embodiment of the disclosure the connecting web here is arranged between two planet wheel bearing bores, each intended for receiving a planet wheel axis for a planet wheel. This embodiment is again technically easy to cast.

In a development of the disclosure the casing is machined complete on a lathe. That is to say all necessary machining operations on the casing can be undertaken with a single machine tool. Here the machining is preferably performed in such a way that only one single clamping set-up of the casing is necessary. This saves machining time and reduces the machine capacity that has to be maintained.

In a further embodiment of the disclosure oil supply ducts are let into the planet wheel arm and the connecting web for dry sump lubrication. This embodiment is feasible due to a simple design configuration of the so-called hearts. Alternatively the lubrication of the planetary gearing is embodied as wet sump lubrication.

In a development of the disclosure an inspection aperture is let into the casing. This inspection aperture is of smaller design than an observation hole cover provided in conventional embodiments and is closed, for example, by a screw. The inspection aperture is arranged on the outer periphery of the casing, so that if necessary the interior space can be inspected using auxiliary aids.

In a development of the disclosure the planetary gearing is part of an energy converter, which converts mechanical energy into electrical energy. This is the preferred embodiment of the planetary gearing according to the disclosure, although other applications are also possible without departing from the scope of the disclosure.

The planetary gearing is preferably part of a wind energy system. Here the planetary gearing is part of a differential mechanism with multiple power branching.

BRIEF DESCRIPTION OF THE DRAWINGS

Advantageous developments of the disclosure can be inferred from the description of the drawing, in which an exemplary embodiment of the disclosure represented in the figures is described in detail.

In the drawing.

DETAILED DESCRIPTION

Figure 1:
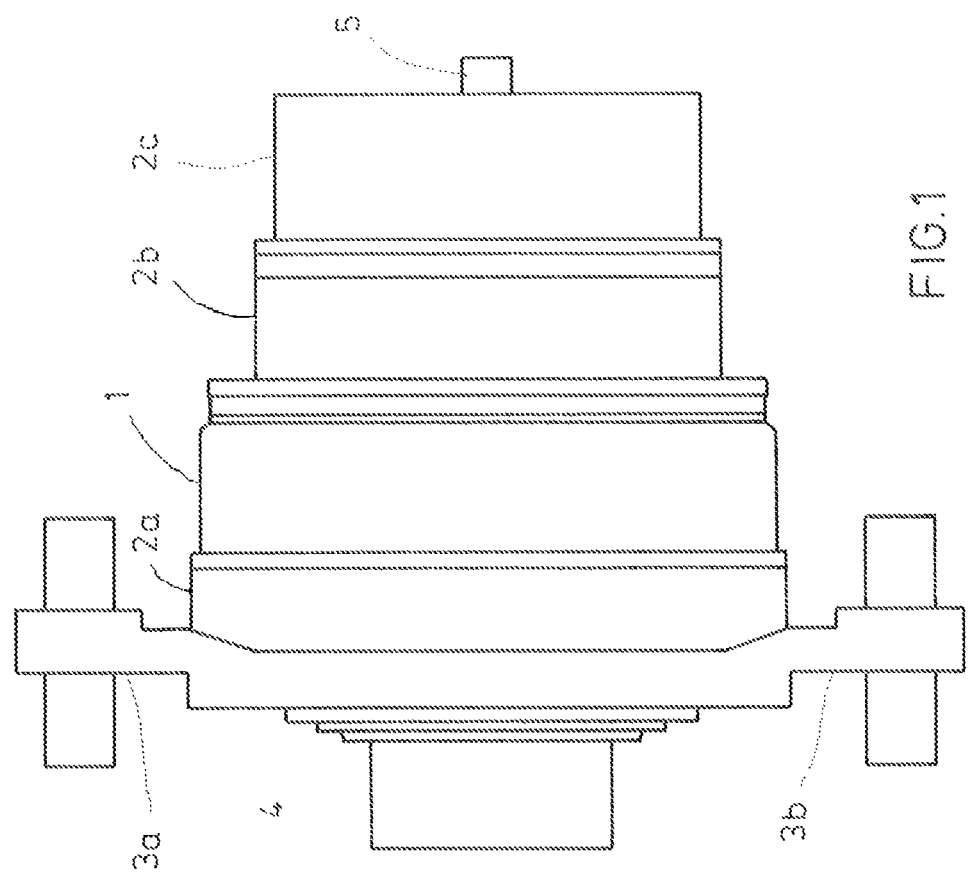
FIG. 1 shows a schematic representation of a differential mechanism having a two-stage planetary gearing and FIG. 2 shows a section through a casing with planet wheel arm integrally formed with the casing.

FIG. 1 shows a schematic representation of a differential mechanism, which is designed, in particular, for a wind energy system. The differential mechanism comprises a two-stage planetary gearing, two planetary gear trains of which are fitted in a casing 1 designed according to the disclosure. The casing 1 is connected, in particular bolted, to further gear casings 2a, 2b, 2c. Opposing torque supports 3a, 3b are attached, for example cast onto, the gear casing 2a, into which a ring gear is fitted. The torque supports 3a, 3b serve for the rotationally fixed mounting of the entire differential mechanism on a carrier. The carrier is the mast of a wind power station, for example.

A drive shaft 4 of the differential mechanism is connected to the rotor of the wind energy system, whilst the output shaft 5 is connected to a generator of the wind energy system.

Figure 2:
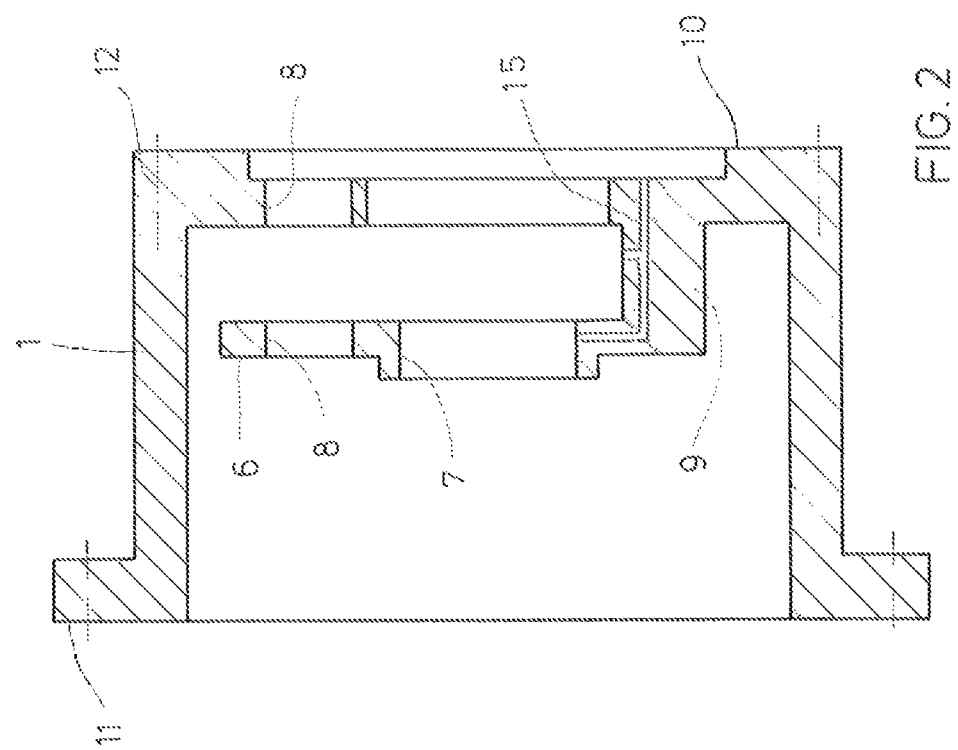

FIG. 2 shows a section through the casing 1, which is integrally formed with a planet wheel arm 6. The planet wheel arm 6 comprises a central bearing bore 7, in which a shaft carrying a sun wheel is supported. Three planet wheel bearing bores 8, each intended for a planet axis carrying a planet wheel, are furthermore arranged at intervals in the planet wheel arm 6, spaced over its periphery. The planet wheels mesh with the internal sun wheel on the one hand and with an externally arranged ring gear on the other. The planet wheel arm 6 is connected to the casing 1 by way of a connecting web 9. Here a side wall 10 of the casing 1 adjacent to the planet wheel arm forms a constituent area of the planet wheel arm 6 in as much as the planet wheel bearing bores 8 are sunk into the side wall 10. In the case of a dry sump lubrication of the individual gear wheels, oil distribution ducts 15, which serve for the specific distribution of lubricating oil, are let into the planet wheel arm. The casing furthermore has an inspection aperture that can be closed by a screw plug on its outer periphery. The casing 1 further comprises a flange 11, by means of which the casing 1 is bolted to the gear casing 2*a*. Situated opposite the flange 11, threads 12, into which bolts can be screwed for fastening the gear casing 2*b* to the casing 1, are sunk into the side wall 10.

The casing 1 is embodied as a cast casing and is machined complete on a lathe.

LIST OF REFERENCE NUMERALS

1 casing
2*a*, 2*b*, 2*c* gear casing
3*a*, 3*b* torque support
4 drive shaft
5 output shaft
6 planet wheel arm
7 bearing bore
8 planet wheel bearing bore
9 connecting web
10 side wall
11 flange
12 thread

What is claimed is:

1. A planetary gearing, comprising:
   at least one drive shaft;
   an output shaft;
   a sun wheel;
   a ring gear;
   planet wheels assigned to the planetary gear train, each in direct engagement with both the sun wheel and the ring gear; and
   a gear casing,
   wherein the planetary gear train includes a planet wheel arm immovably arranged in a casing,
   integrally formed with the casing,
   wherein said planet wheel arm and said gear casing each define bearing bores for supporting the planet wheels therebetween, and
   further wherein the planet wheel arm defines a central bearing bore for supporting the sun wheel.

2. The planetary gearing according to claim 1, wherein:
   the planetary gearing is at least a two-stage planetary gearing, and
   the second planetary gear train includes the planet wheel carrier immovably arranged in the casing.

3. The planetary gearing according to claim 1, wherein the gear casing is a multipart gear casing.

4. The planetary gearing according to claim 1, wherein the casing is a part of the gear casing.

5. The planetary gearing according to claim 1, wherein the casing is a cast casing.

6. The planetary gearing according to claim 1, wherein the planet wheel arm is connected to the casing by way of at least one connecting web.

7. The planetary gearing according to claim 6, wherein the connecting web is arranged between two planet wheel bearing bores.

8. The planetary gearing according to claim 1, wherein the casing is machined complete on a lathe.

9. The planetary gearing according to claim 1, wherein oil supply ducts are formed in the planet wheel arm.

10. An energy converter configured to convert mechanical energy into electrical energy, comprising:
    a planetary gearing, comprising at least one drive shaft, an output shaft, a sun wheel, a ring gear, planet wheels assigned to the planetary gear train in direct engagement with the sun wheel and ring gear, and a gear casing,
    wherein the planetary gear train includes a planet wheel arm immovably arranged in a casing,
    integrally formed with the casing,
    wherein said planet wheel arm and said gear casing each define bearing bores for supporting the planet wheels therebetween, and
    further wherein the planet wheel arm defines a central bearing bore for supporting the sun wheel.

11. The energy converter of claim 10, wherein the planet wheel arm is connected to the casing by a web arranged between the bearing bores.

12. A wind energy system having a multistage planetary gearing, comprising:
    a planetary gearing, comprising at least one drive shaft, an output shaft, a sun wheel, a ring gear, planet wheels assigned to the planetary gear train in direct engagement with the sun wheel and ring gear, and a gear casing,
    wherein the planetary gear train includes a planet wheel arm immovably arranged in a casing,
    integrally formed with the casing,
    wherein said planet wheel arm and said gear casing each define bearing bores for supporting the planet wheels therebetween, and
    further wherein the planet wheel arm defines a central bearing bore for supporting the sun wheel.

13. The wind energy system of claim 12, wherein the planet wheel arm is connected to the casing by a web arranged between the bearing bores.

* * * * *